(12) United States Patent
Yokoyama (10) Patent No.: US 6,260,431 B1
(45) Date of Patent: Jul. 17, 2001

(54) CONSTRUCTION OF AN ON-VEHICLE LEVER SWITCH

(75) Inventor: Toshiaki Yokoyama, Tokyo (JP)

(73) Assignee: Niles Parts Co., Ltd., Tokyo (JP)

( * ) Notice: Subject to any disclaimer, the term of this patent is extended or adjusted under 35 U.S.C. 154(b) by 0 days.

(21) Appl. No.: 09/313,352

(22) Filed: May 18, 1999

(30) Foreign Application Priority Data

Jul. 31, 1998 (JP) .................................................. 10-230258

(51) Int. Cl.[7] ........................................................ G05G 1/00
(52) U.S. Cl. ........................... 74/469; 74/484 R; 200/61.54
(58) Field of Search ........................ 74/469, 470, 479.01, 74/480 R; 200/61.54

(56) References Cited

U.S. PATENT DOCUMENTS

| | | | |
|---|---|---|---|
| 5,003,132 | * | 3/1991 | Lagier ........................................ 200/4 |
| 5,453,588 | * | 9/1995 | DuRocher et al. ................ 200/61.54 |
| 5,473,809 | * | 12/1995 | DuRocher et al. ..................... 29/622 |
| 5,610,378 | * | 3/1997 | DuRocher et al. ................ 200/61.54 |
| 5,724,719 | * | 3/1998 | DuRocher et al. ..................... 29/622 |
| 5,780,794 | * | 7/1998 | Uchiyama et al. ................ 200/61.54 |
| 5,847,342 | * | 12/1998 | Uchiyama et al. ................ 200/61.54 |
| 5,852,867 | * | 12/1998 | DuRocher ............................... 29/622 |
| 6,034,338 | * | 3/2000 | Uchiyama .......................... 200/61.27 |

FOREIGN PATENT DOCUMENTS

| | | | |
|---|---|---|---|
| 8-506204 | 7/1996 | (JP) | ............................... H01H/19/00 |
| WO 94/11892 | 5/1994 | (WO) . | |

* cited by examiner

Primary Examiner—Sherry Estremsky
Assistant Examiner—Tisha D. Lewis
(74) Attorney, Agent, or Firm—Ronald P. Kananen; Rader, Fishman & Grauer (57) ABSTRACT

An on-vehicle lever switch having a rotary knob 4, a third lever 22 having the rotary knob 4 fixed to one end thereof and an operating rod 22a at the other end thereof, a second lever 6 having a shaft hollow cylinder 6a into which a shaft 22c of the third lever 22 is inserted, a first lever 3 into which the second lever 6 is inserted, a nonmovable member 18 fixed to the first lever 3, and a nonmovable knob 21 mounted at a location close to a tip of the first lever 3 with respect to the rotary knob 4. The nonmovable knob 21 is formed with a window 21d in its periphery. A slide knob 16 is slidably disposed in the nonmovable knob 21 with a control 16b projecting through the window 21d outwardly relative to the nonmovable knob 21. With this construction, a rotary switch, a slide switch, and a push button switch can all be mounted at an end portion of the third lever 22.

24 Claims, 8 Drawing Sheets

CONSTRUCTION OF AN ON-VEHICLE LEVER SWITCH

BACKGROUND OF THE INVENTION

1. Field of the Invention

The present invention relates generally to switches for vehicles and, in particular, to a construction of an on-vehicle lever switch having a rotary knob attached to an end portion of a lever.

2. Description of the Related Art

A conventional lever switch for a vehicle is disclosed, for example, in Japanese Patent Preliminary Publication (KOKAI) No. 8-506204. This conventional lever switch has a slide switch and a rotary switch mounted thereto. A rotary knob mounted to the end portion of the operating lever has, for example, circuit boards for the slide switch therein.

However, this conventional lever switch has a large number of parts accommodated in the rotary knob and, therefore, is of a complicated structure. Accordingly, additional switches cannot be mounted in an end portion of the operating lever.

SUMMARY OF THE INVENTION

It is an object of the present invention to provide an on-vehicle lever switch that solves the problems found in the conventional lever switch described above. It is a further object of the present invention to provide an on-vehicle lever switch having a rotary switch, a slide switch, and a push-button switch attached to an end portion of a lever.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to achieve the objects set forth above, a construction of an on-vehicle lever switch is provided, comprising: a rotary knob; a third lever having the rotary knob fixed to one end thereof and an operating rod at the other end thereof; a second lever having a shaft hollow cylinder into which a shaft of the third lever is inserted; a first lever into which the second lever is inserted; a nonmovable member fixed to the first lever; and a nonmovable knob mounted at a location close to a tip of the first lever with respect to the rotary knob. The lever switch is characterized by the nonmovable knob being formed with a window in its periphery, a slide knob being slidably disposed in the nonmovable knob with a control that projects through the window outwardly relative to the nonmovable knob, and a push button of a switch being disposed in a knob receiving hole formed at a location close to the tip of the first lever with respect to the nonmovable knob.

According to another aspect of the present invention, the nonmovable knob has a recess at an edge portion of the window close to the tip of the first lever, and the slide knob has a cutout formed therein that engages the recess.

According to another aspect of the present invention, the slide knob has guide straps on the left side and the right side thereof, and the nonmovable knob has guide grooves formed in an inner wall thereof, the guide straps fitting into the guide grooves.

According to another aspect of the present invention, the nonmovable knob has a projection near the window through which the control projects outwardly from the nonmovable knob.

According to another aspect of the present invention, the nonmovable knob holds the push button disposed at one opening of a knob receiving hole thereof, the slide knob is inserted from the other opening of the knob receiving hole, and the slide knob is assembled to the nonmovable knob with the control projecting through the window outwardly from the nonmovable knob.

According to another aspect of the present invention, the push button has a resilient fastening strap that engages a stepped portion formed in the nonmovable knob, and a slide shaft that is slidably inserted into a bearing hole formed in the nonmovable member.

According to another aspect of the present invention, the push button has a contact strap accommodating groove formed in a slide shaft that receives a slide contact strap therein.

According to another aspect of the present invention, the push button has a guide groove formed in the slide shaft that engages a projection formed in a wall of the bearing hole.

According to another aspect of the present invention, the nonmovable member has a nonmovable contact plate disposed in the bearing hole, and another nonmovable contact plate disposed on the panel surface.

According to another aspect of the present invention, the nonmovable member has the nonmovable contact plate which contacts with the slide contact strap, the another nonmovable contact plate which contacts the slide contact strap, and a terminal which is electrically continuous with the nonmovable contact plates; and all of the nonmovable contact plates and terminal are insert-molded.

According to another aspect of the present invention, the nonmovable member has: a flange formed substantially in the middle of the nonmovable member and rotatably fitting into an opening in the first lever and an opening in the rotary knob; a round hollow cylinder and a connector which are formed on one side of the flange, the connector having the terminal built therein; an engagement portion formed on the other side of the flange, the engagement portion receiving the nonmovable knob fixedly assembled via the rotary knob and receiving the slide shaft of the push button; and a cavity in which the third lever and the rotary knob are coupled together between the flange and the engagement portion, and in which a resilient fastening tongue formed at a tip of the second lever is received.

According to another aspect of the present invention, the nonmovable member has a tongue formed at a periphery of the engagement portion; and the nonmovable knob has the engagement portion formed in an inner wall thereof, the engagement portion engaging the tongue.

According to another aspect of the present invention, the nonmovable member has: a blind hole for receiving a stopper which is pressed against the stopper groove formed in the rotary knob; a blind hole for receiving a stopper which is pressed against a stopper groove formed in the first lever; and a hole for receiving a stopper which is pressed against a stopper groove formed in the slide knob.

According to another aspect of the present invention, the slide knob is formed in a one piece construction with a stopper projection which has the stopper groove formed in an underside of the stopper projection; and the nonmovable member has a slit formed therein into which the stopper projection engages, the slit crossing the hole.

According to yet another aspect of the present invention, the slide contact strap includes a plurality of legs each of which has a contact portion at a free end thereof, the legs being continuous with each other through a common part; and the slide knob has a slit formed in a lateral side thereof into which the common part is inserted, and a pull-out preventing tongue engaging the end surface of the common part, the pull-out preventing tongue being formed at an end near a base of the stopper projection.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

An on-vehicle lever switch according to a preferred embodiment of the present invention will now be described in detail with reference to FIGS. 1 to 10 of the accompanying drawings.

Figure 1:
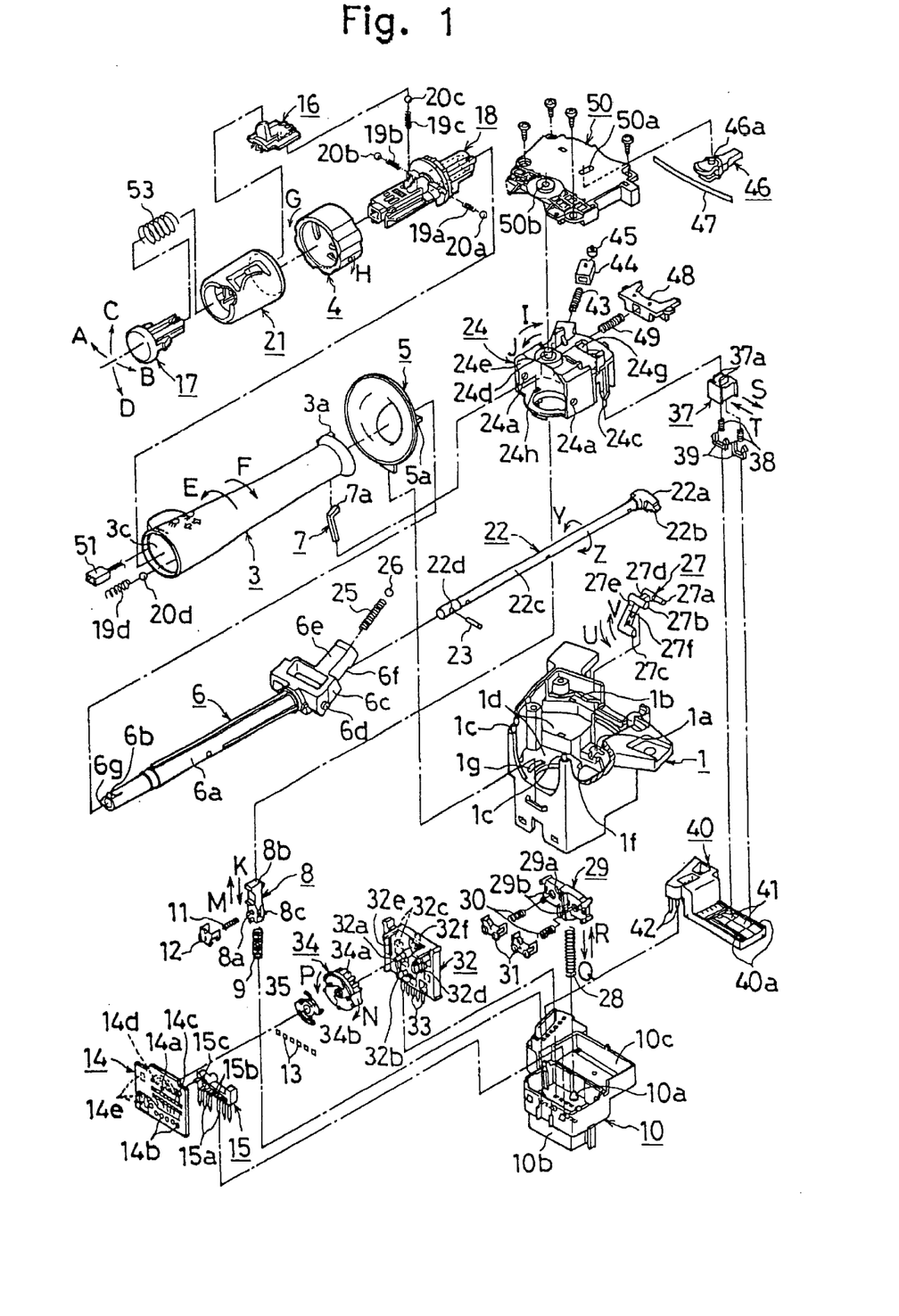
FIG. 1 is an exploded perspective view, with a partial cross-sectional view, illustrating a preferred embodiment of the present invention.
Figure 3:
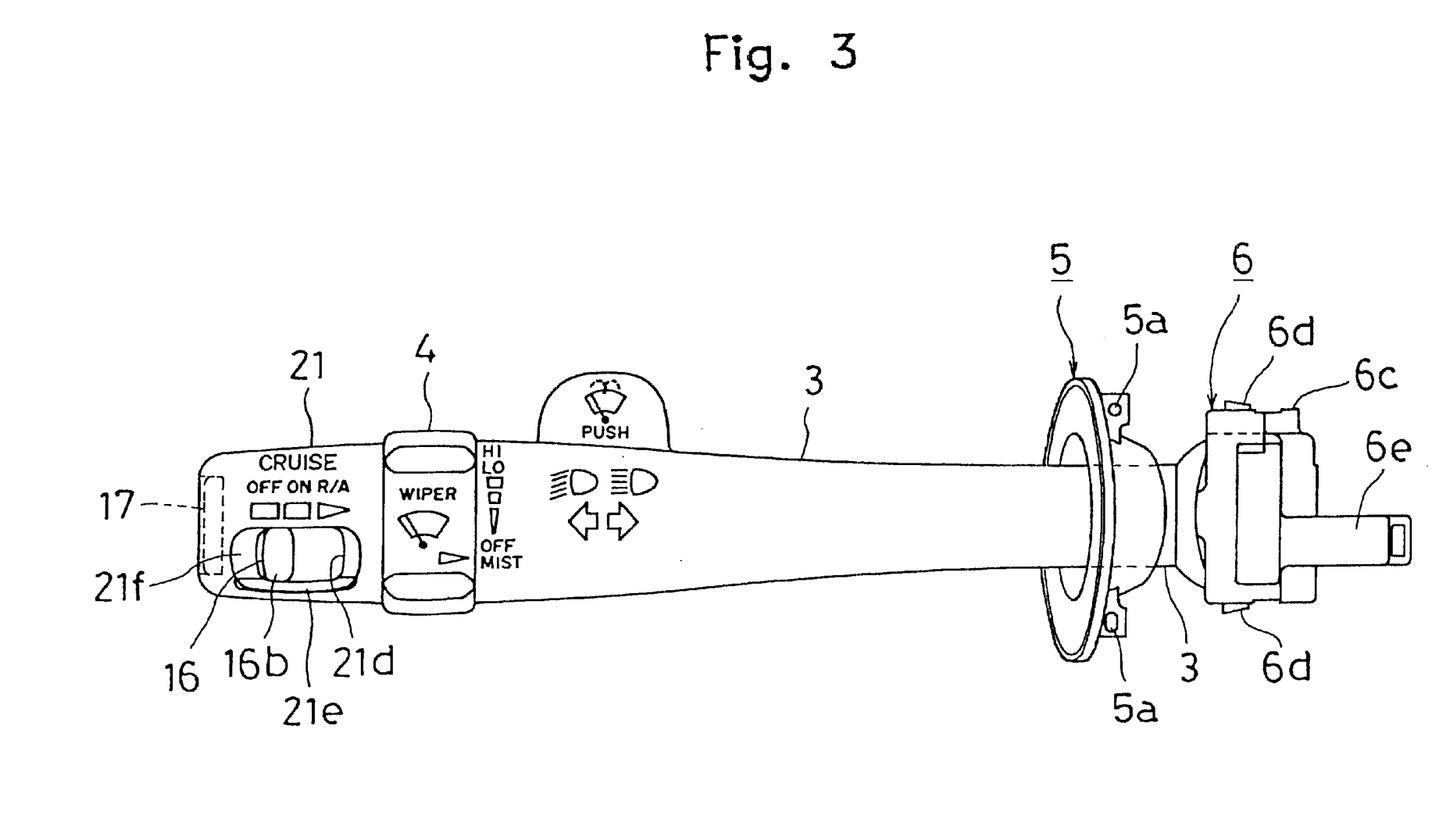
FIG. 3 is a front view of a relevant portion of the lever shown in FIG. 2.

A case 1 is mounted to, for example, the left side of a body (not shown) of a combination switch 2 for an automobile. The case 1 and combination switch 2 shown in FIGS. 1 and 3 are switches that mounted near a steering wheel located on the left side of the vehicle. The present embodiment will be described in detail with respect to a switch for a left-hand drive vehicle. If the present invention is to be practiced for a right-hand drive vehicle, the case 1, combination switch 2, and all of the later-described parts can be formed as mirror-images of those of the lefthand drive vehicle.

The body has a cylindrical round pipe through which a steering shaft (not shown) is inserted along a longitudinal axis of the cylindrical round pipe. The case 1 is inserted into the steering shaft from the left side and assembled to the steering column (not shown) by screwing.

The combination switch 2 includes switch functions such as a turn signal switch, a passing switch, a main/dimmer selector switch, a wiper/washer switch, and an automatic speed control device (ASCD). When a first lever 3 is operated in the left and right directions shown by arrows A and B, respectively, the combination switch 2 performs a function of the turn signal switch where a direction indicator lamp cycles on and off. When the first lever 3 is operated upward, as shown by arrow C, the combination switch 2 performs a function of the passing switch where the front lights temporarily turn on. When the first lever 3 is operated upward and downward, as shown by arrows C and D, the combination switch 2 performs a function of the main/dimmer switch which selects either "main" or "dimmer" of the front lights.

When the first lever 3 is rotated in a direction shown by arrow E, the combination switch 2 performs the function of the wiper/washer switch where the wiper is driven to swing three or four times and washer liquid is ejected to the windshield. When the rotary knob 4 located adjacent to the tip of the first lever 3 is rotated in a direction shown by arrow G or H, the combination switch 2 performs the function of the wiper switch which controls various speeds and intermittent operation of the wiper.

Figure 2:
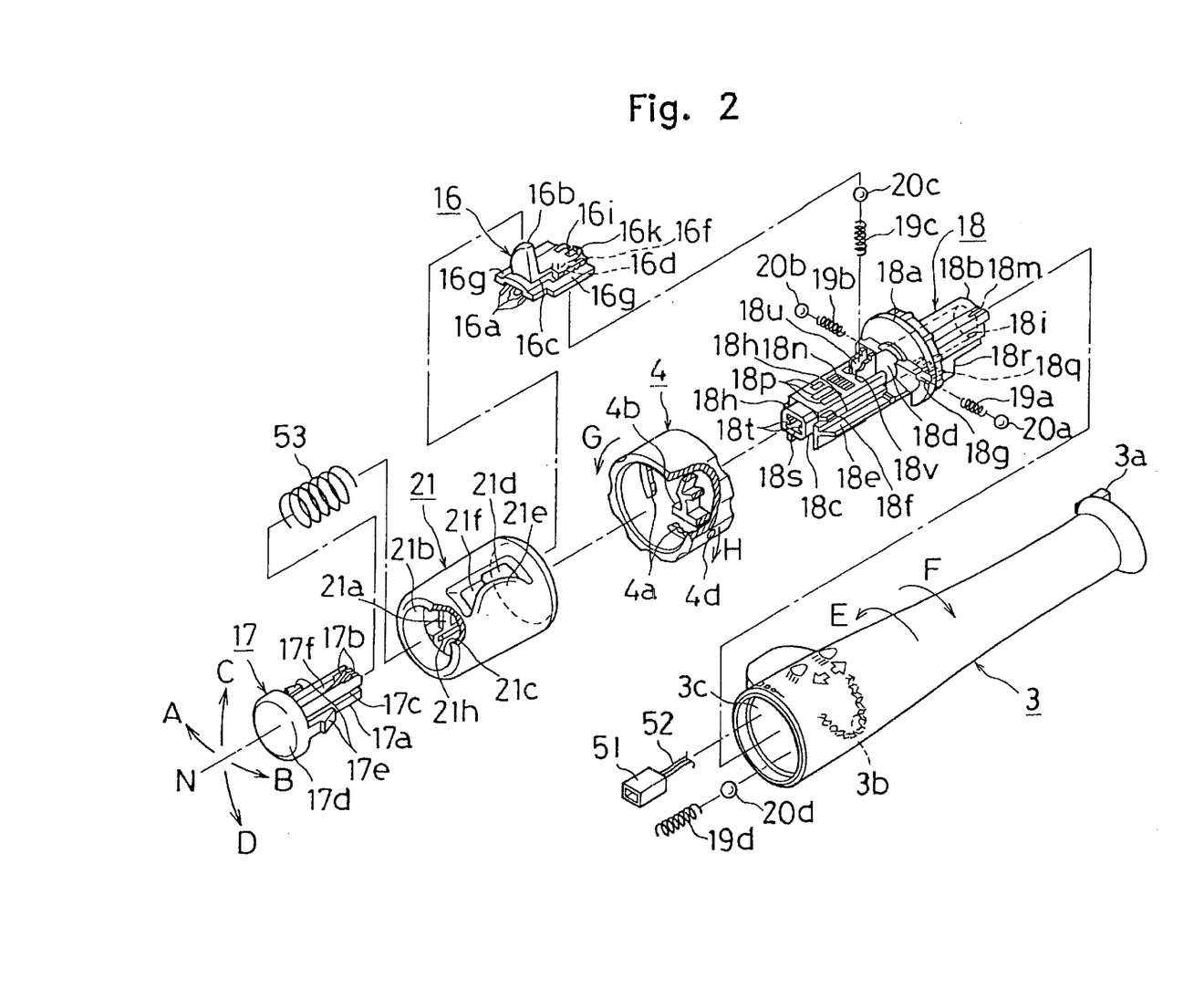
FIG. 2 is an enlarged exploded perspective view of a relevant portion of a lever of the preferred embodiment of the present invention.

The first lever 3 is an operating member in the form of a substantially round hollow cylinder, as shown in FIG. 2. A horn-shaped boot 5 loosely fits over one end of the first lever 3 close to the case 1, and a second lever 6 is inserted into the first lever 3 through an opening of the first lever 3. The first lever 3 serves as an operating member for the wiper/washer switch that is rotated about the shaft 6d of the second lever 6 in the direction shown by arrow E and automatically returned in a direction shown by arrow F. The first lever 3 has an operating rod 3a at the other end of the first lever 3 beside the case 1. The operating rod 3a is in the form of a short projection that projects to pressure-abut a head 7a of a push rod 7. The operating rod 3a rotates together with the first lever 3, thereby pressing the head 7a of the push rod 7 to move upward and downward. Then, the head 7a of the push rod 7 drives a first movable piece 8 in upward and downward directions shown by arrows K and M.

The push rod 7 is a metal rod-like member substantially in the shape of an "L." The push rod 7 is pressed by the first movable piece 8 urged by a return spring 9, so that the head 7a is always in a pressure contact with the operating rod 3a. The push rod 7 is inserted into a cylinder 24h formed on the bottom of an opening 24e of a movable panel 24. The push rod 7 is movable upward and downward in the cylinder 24h. The cylinder 24h is pivotally horizontally inserted into a through-hole 1g formed in the inner bottom 1d of the case 1.

The boot 5 is mounted to the case 1, as shown in FIGS. 1 and 3, thereby hiding a base 6c of the second lever 6 and the movable panel 24 from the driver's sight. The boot 5 is sandwiched between the case 1 and the lid 50 with projections 1c of the case 1 fitting into through-holes 5a formed in the lower rear side of the boot 5.

As shown in FIG. 1, the upper end portion of the first movable piece 8 engages the push rod 7. The first movable piece 8 is disposed on the inner bottom of a terminal panel 10 with the return spring 9 positioned between the first movable piece 8 and the inner bottom of the opening 10a.

A movable contact plate 12 is mounted to the side portion of the first moving piece 8 with a contact spring 11 positioned between the movable contact plate 12 and the first movable piece 8.

The first movable piece 8 is formed with a blind hole 8a in the side surface thereof facing the first board 14. The blind hole 8a receives the contact spring 11 therein. The first movable piece 8 is also formed with another blind hole (not shown), which receives the return spring 9.

The first movable piece 8 has a wide head 8b on its top which the lower end of the push rod 7 abuts. The movable piece 8 is formed with a plurality of guide projections 8c in the side of the movable piece, the guide projections 8c engaging a guide groove 32e vertically formed in a second board 32. When the first lever 3 is rotated, the first movable piece 8 is pushed by the push rod 7 to be guided along the guide groove 32e, thereby moving vertically in directions shown by arrows K and M. Then, when the movable contact plate 12 is brought into contact with fixed contacts 14e, the circuit is closed so that the wiper/washer is activated.

As shown in FIG. 1, the first board 14 is in the form of a printed circuit board on which fixed contacts 14d and 14e are printed, and electronic components 13 and solder part 15b of a terminal panel 15 and so on are mounted by soldering. The first board 14 and terminal panel 15 are inserted through an opening 10a into the case 1, sandwiched by a surface remote from the inner bottom 1d of the case 1, and the terminal 15a is inserted into a connector 10b. Thus, the first board 14 and terminal 15 are fixedly assembled to the case 1. The first board 14 is formed with a hole 14a into which a shaft 32a enters, a through-hole 14b into which the soldering part 15b of the terminal 15a fits, and a through-hole 14c into which a rod 32b of the second board 32 engages.

The terminal panel 15 is insert-molded with the terminal 15a such that the terminals 15a project downwardly and the soldering parts 15b continuous with the terminals 15a project laterally. The terminal panel 15 fits at its lower end into the inner bottom below the opening 10a. The terminals 15a are inserted into the connector 10b, the soldering parts 15b are soldered into through-holes 14b formed in the first board 14, and the shaft 32a fits into the through-hole 15c. In this manner, the terminal panel 15 is fixedly supported.

As shown in FIG. 2, the first lever 3 is formed with a stopper groove 3b in one end thereof near an opening 3c adjacent to the rotary knob 4. The stopper groove 3b receives a stopper 20d and a stopper spring 19d therein. A nonmovable member 18 has a flange 18a formed substantially in the middle thereof. The flange 18a is formed with a stopper groove (not shown) therein on the side of the first lever 3. The stopper 20d is urged by the stopper spring 19d to press the stopper groove formed in the side surface of the flange 18a, so that the first lever 3 automatically returns.

The nonmovable member 18 is inserted into the opening 3c of the first lever 3, as shown in FIG. 2. The nonmovable member 18 includes a round hollow cylinder 18b into which a shaft hollow cylinder 6a is inserted, the flange 18a with stopper springs 19a and 19b and stoppers 20a and 20b that are radially extendable and retractable, and an engagement portion 18c to which a nonmovable knob 21 is secured. The shaft hollow cylinder 6a is inserted into the round hollow cylinder 18b of the nonmovable member 18, which in turn is inserted into the first lever 3. A resilient fastening tongue 6b at an end portion of the shaft hollow cylinder 6a engages an edge of a cavity 18d formed adjacent to the flange 18a, and a key 6g fits into a key groove 18k. When the resilient fastening tongue 6b engages the edge of the cavity 18d, and the key 6g fits into the key groove 18k, the nonmovable member 18 is secured to the second lever 6. The first lever 3 receives the shaft hollow cylinder 6a loosely inserted thereinto and has one end connected to the base 6c and the other end connected to the flange 18a. Thus, the first lever 3 is rotatably positioned with respect to the second lever 6.

Figure 8:
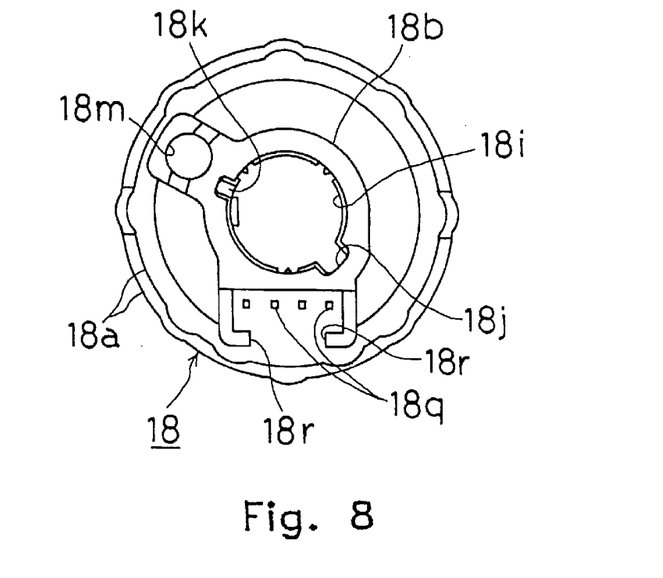
FIG. 8 is an enlarged cross-sectional view of the nonmovable knob.

Formed beside the flange 18a are blind holes 18g into which stopper springs 19a and 19b and stoppers 20a and 20b are inserted, as shown in FIG. 2. The rotary knob 4 is positioned to surround the blind holes 18g. As shown in FIG. 8, the round hollow cylinder 18b includes a groove 18j into which the resilient fastening tongue 6b of the second lever 6 is inserted, and the key. groove 18k with which the key 6g is engaged. The groove 18j and the key groove 18k are formed in a wall of the through-hole 18i. The round hollow cylinder 18b is formed with a blind hole 18m in its outer peripheral portion, the blind-hole 18m receiving the stopper 20d and stopper spring 19d therein. The round hollow cylinder 18b is also formed with a connector 18r with terminals 18q built in. The terminals are electrically continuous to nonmovable contact plates 18n and 18p.

The engagement portion 18c has a projecting flap 18e, a tongue 18f, a lateral groove 18h, and nonmovable contact plates 18n and 18p. The projecting flap 18e engages a guide groove 21h formed in the nonmovable knob 21 shown in FIG. 7. The tongue 18f engages a fastening portion 21a provided inside of the fixed knob 21 near an opening of the fixed knob 21. The lateral groove 18h guides the projection 4b of the rotary knob 4 to the cavity 18d. The cavity 18d is a blind hole formed adjacent to a longitudinal end of the round hollow cylinder 18b and in which the projection 4b of the rotary knob 4 is received and is rotatable through a predetermined angle. The tongue 18f is formed under the nonmovable member 18 and engages the fastening portion 21a of the nonmovable knob 21 to fix the nonmovable knob 21 to the nonmovable member 18.

The blind holes 18g are formed at locations, for example, a peripheral portion of the flange 18a, the farthest from an axis of the nonmovable member 18. The lateral groove 18h is formed for mounting the rotary knob 4 adjacent to the flange 18a and positioning the projection 4b in the cavity 18d. The lateral groove 18h runs from the end of the nonmovable member 18 to the cavity 18d. The through-hole 18i fittingly receives the end portion of the shaft hollow cylinder 6a of the second lever 6. The terminals 18q of the connector 18r beside the through-hole 18i fit to the connector 51 connected to a cord 52, thereby connecting to, for example, a power supply.

The engagement portion 18c is formed with a bearing hole 18s in which a slide shaft 17a of a push button 17 is supported. The nonmovable member 18 has the nonmovable contact plates 18p in the surface of the engagement portion 18c, and nonmovable contact plates 18n in the bearing hole 18s of the engagement portion 18c, both nonmovable contact plates 18p and 18n being insert-molded with the nonmovable member 18. A slide contact strap 16a of a slide knob 16 slides into contact with the nonmovable contact plate 18p, and a slide contact strap 17b mounted to a slide shaft 17a slides into contact with the nonmovable contact plate 18n. The wall that defines the bearing hole 18s has a projection 18t that engages guide grooves 17c formed in opposing sides of the slide shaft 17a.

The slide knob 16 and push button 17 are used for operating a switch, such as one for the automatic speed control device (ASCD). The slide knob 16 is used for operating a slide switch that has an OFF position, an ON position, and a RETURN (resume accelerator) position. The push button 17 is used for operating a push button switch, which is of an automatic return type, and is used for setting a speed when the vehicle runs in a constant speed cruising mode.

An operating portion 17d of the push button 17 slidably fits into a knob receiving hole 21b of the nonmovable knob 21, and the push button 17 is urged by a return spring 53 so that resilient fastening straps 17e engage a stepped portion 21c in the nonmovable knob 21. One end of the slide contact strap 17b is fixed on the bottom of a contact strap accommodating groove 17f formed in an upper portion of the slide shaft 17a, and the other end of the slide contact strap 17b projects outwardly from the contact strap accommodating groove 17f so that the slide contact strap 17b is in pressure contact with the nonmovable contact plate 18n.

As shown in FIG. 2, the rotary knob 4 has two sets of stopper grooves 4a into which the two stoppers 20a and 20b are pressed, respectively, the projection 4b in slidable contact with the side surface of an upper half of the flange 18a, and an insertion hole 4d into which a pin 23 is inserted. The pin 23 extends through the insertion hole 4d and the through-hole 22d in the third lever 22, so that the rotary knob 4 rotates together with the third lever 22.

Figure 4:
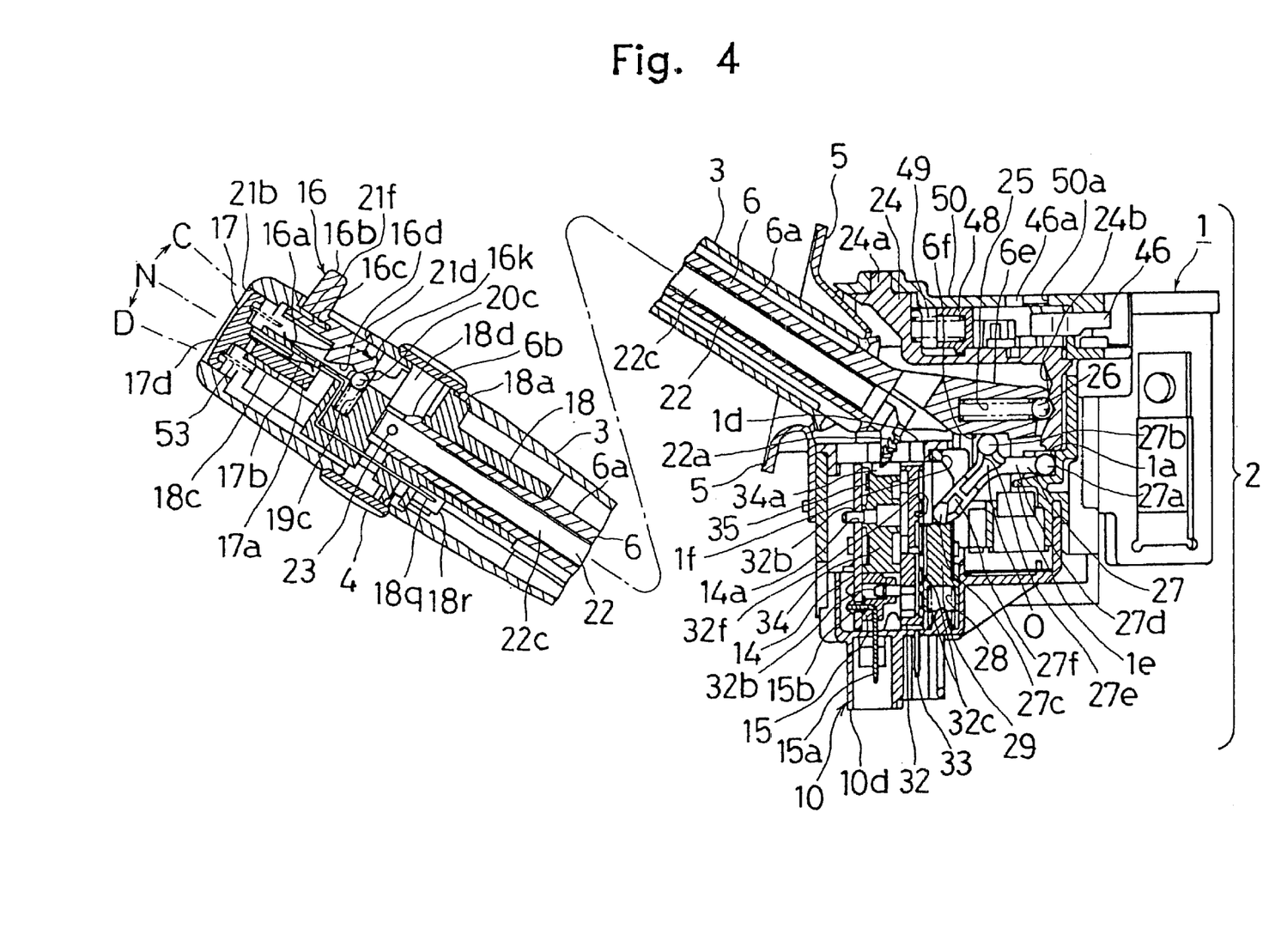
FIG. 4 is an enlarged longitudinal cross-sectional view of the preferred embodiment of the present invention.
Figure 5:
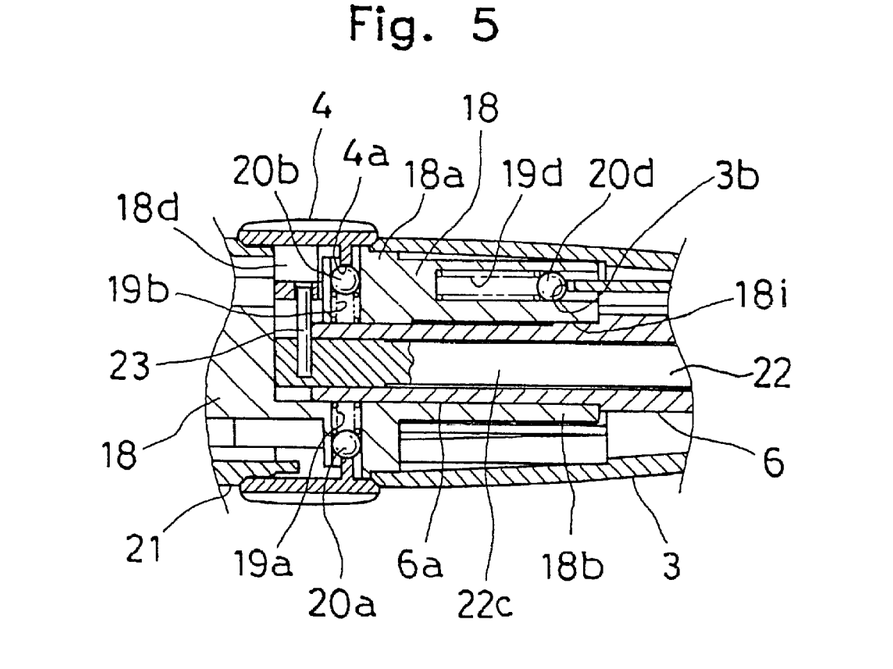
FIG. 5 is an enlarged top view of a nonmovable knob having a slide knob assembled thereto.

As shown in FIGS. 2 and 4, when the nonmovable knob 21 engages the engagement portion 18c of the nonmovable member 18, the guide groove 21h engages the projecting flap 18e, and the fastening portion 21a is fastened to the tongue 18f, the nonmovable knob 21 is firmly assembled to the nonmovable member 18. Upon assembly of the nonmovable knob 21 to the nonmovable member 18, the nonmovable knob 21, the nonmovable member 18, and the second lever 6 move together. The nonmovable knob 21 accommodates the slide knob 16 therein, and a control 16b of the slide knob 16 slidably extends through a window 21d of the nonmovable knob 21 outwardly from the nonmovable knob 21. The nonmovable knob 21 is formed with a projection 21e in the form of a semicircular disc that is located adjacent to the window 21d and projects outwardly from the nonmovable knob 21.

Figure 7:
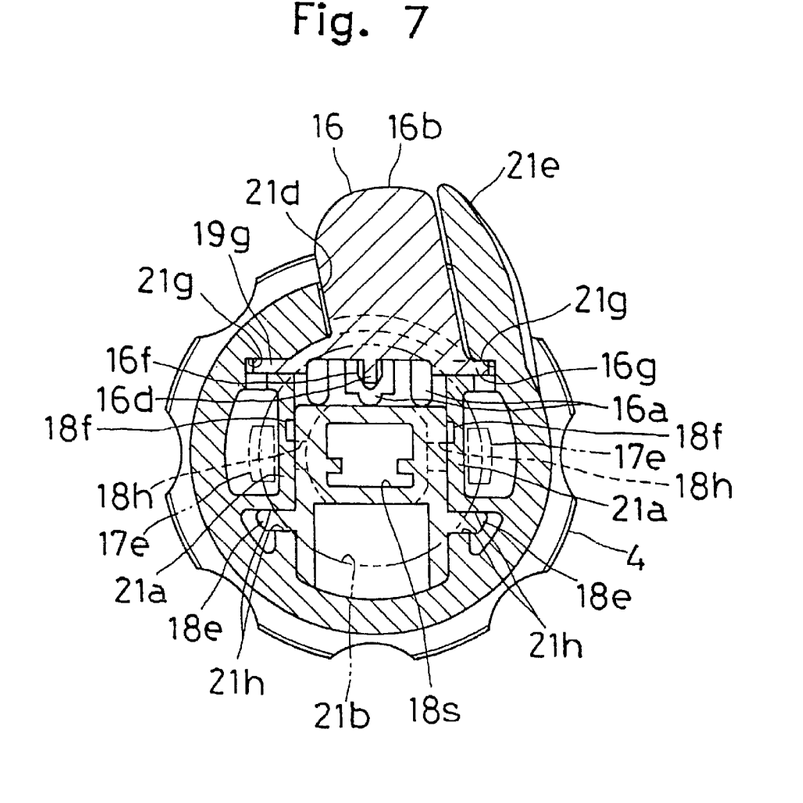
FIG. 7 is an enlarged side view of a nonmovable member.
Figure 9:
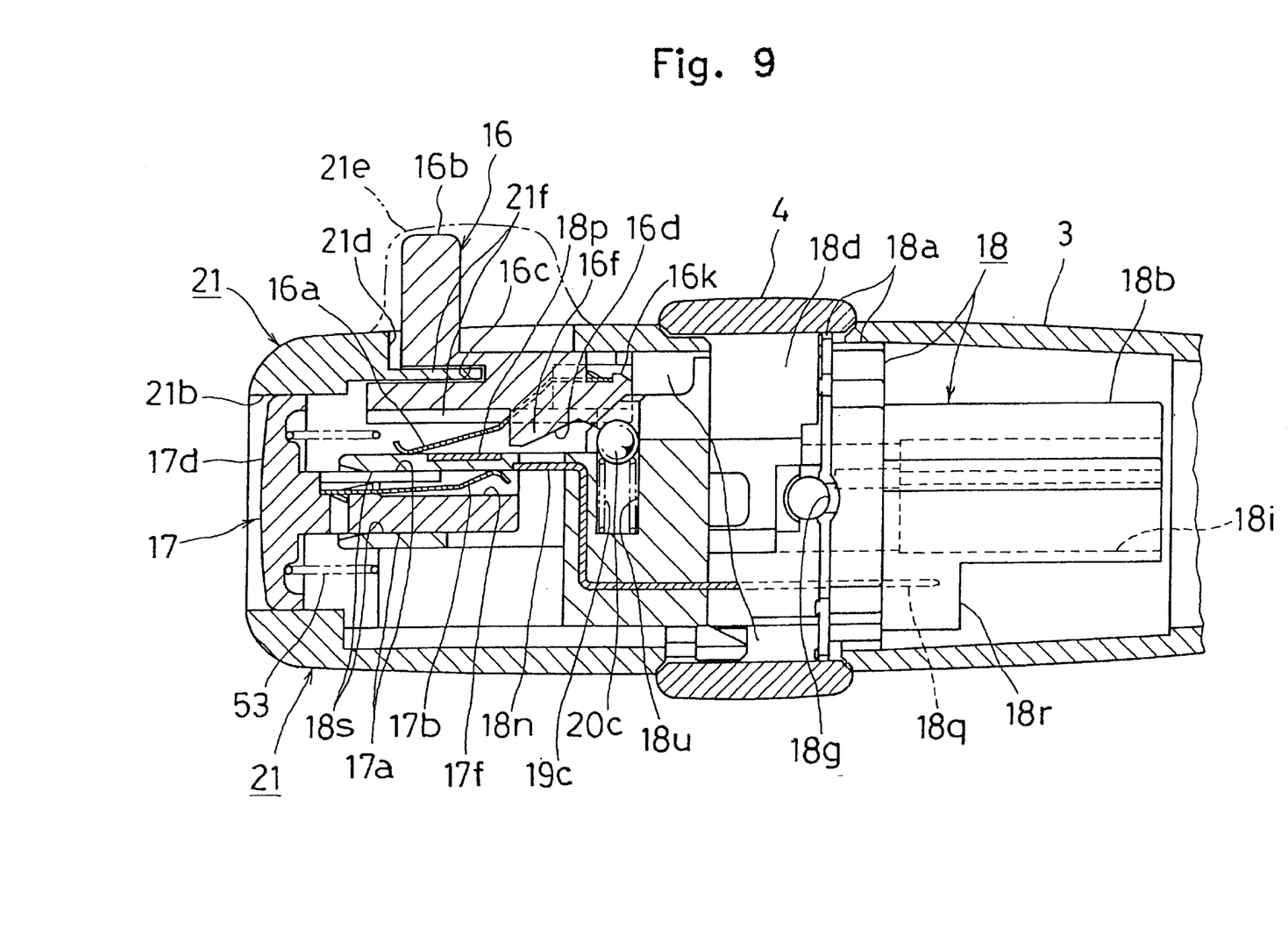
FIG. 9 is an enlarged cross-sectional view of the nonmovable knob.

As shown in FIG. 2, the slide knob 16 has an operation element generally in the shape of a semicircular plate, and has the control 16b formed on the top surface thereof, and a stopper groove 16d and a slide contact strap 16a formed on the bottom surface thereof. The stopper groove 16d receives the stopper 20c urged by the stopper spring 19c. The slide knob 16 has a cutout 16c which laterally extends under the control 16b around the slide knob 16. The cutout 16c engages a recess 21f of the window 21d closer to the tip of the lever with respect to the nonmovable knob 21, so that the slide knob 16 slidably moves. As shown in FIG. 9, since the laterally extending cutout 16c engages the recess 21f, the control 16b does not sink in the window 21d even when the control 16b is pressed. The slide knob 16 has a stopper projection 16f which is formed in an underside thereof and is continuously integral with the slide knob 16. The slide knob 16 also has guide straps 16g on the left and right side walls that engage the guide grooves 21g oppositely formed in the inner side of the nonmovable knob 21, as shown in FIGS. 2 and 7.

Figure 6:
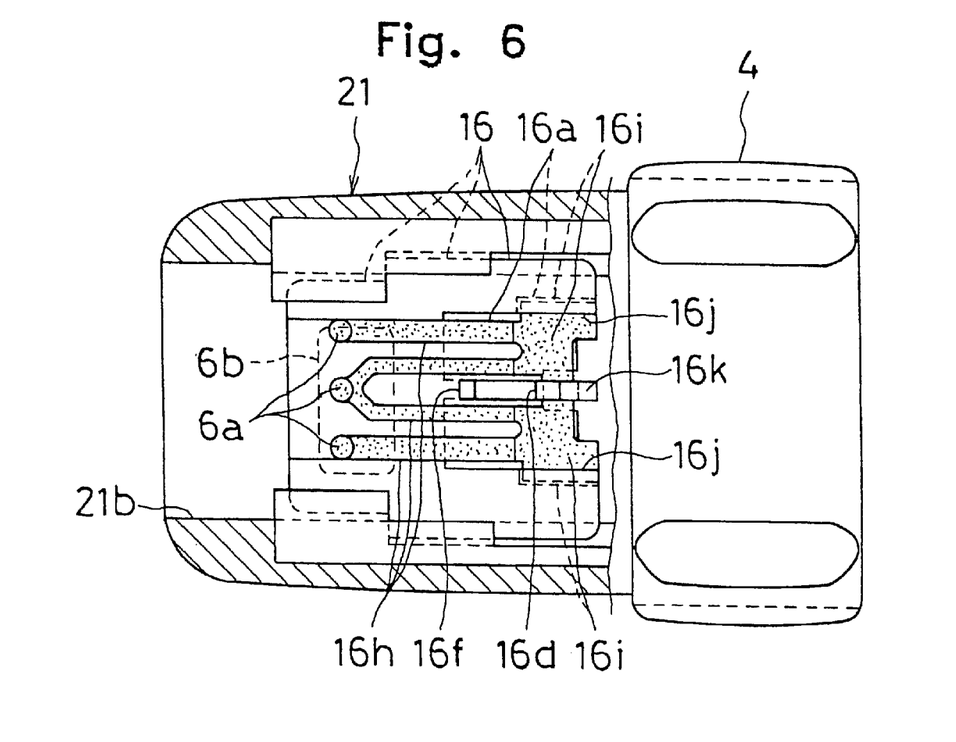
FIG. 6 is an enlarged side view of the nonmovable knob shown in FIG. 5.

As shown in FIGS. 2 and 6, the slide contact strap 16a has a plurality of legs 16h each of which has a contact at a tip thereof. The slide contact strap 16a is a sheet of contact plate having a spring action and has two common parts 16i continuous with the legs 16h. The common parts 16i are inserted into slits 16j formed in the side surface of the slide knob 16, and the end of the common put 16i abuts a pull-out preventing tongue 16k formed at the obliquely opposite side of the stopper projection 16f, so that the slide contact strap 16a is fixed to the slide knob 16.

Figure 10:
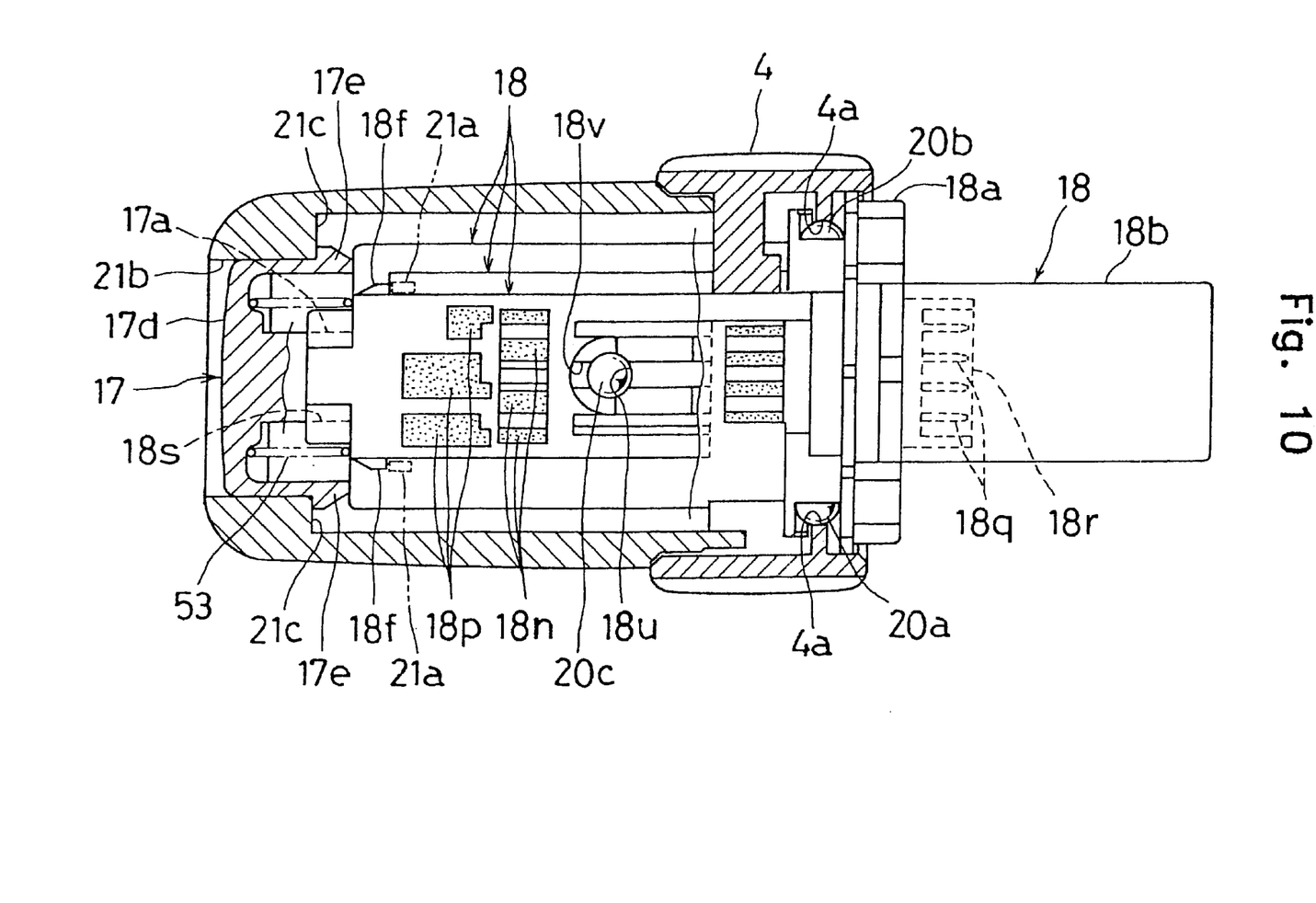
FIG. 10 is an enlarged side view of the nonmovable knob.

As shown in FIGS. 2 and 9, the stopper spring 19c and stopper 20c are inserted into a hole 18u formed in the top surface on which the fixed contact plates 18p are disposed, the hole 18u being between opposed small walls. As shown in FIG. 10, the hole 18u extends in a direction that crosses a slit 18v into which the stopper projection 16f having the stopper groove 16d engages.

As shown in FIG. 2, the third lever 22 has the through-hole 22d in one end thereof and an operating rod 22a in the shape of a gear at the other end thereof The third lever 22 has a shaft 22c inserted into the shaft hollow cylinder 6a of the second lever 6, so that the shaft 22c is journaled at the end of the shaft hollow cylinder 6a. After the shaft 22c has been inserted into the shaft hollow cylinder 6a and the shaft hollow cylinder 6a has been inserted into the first lever 3, the pin 23 is inserted into the insertion hole 4d formed in the rotary knob 4 and the through-hole 22d formed in the third lever 22, thereby fixedly assembling the rotary knob 4 to the third lever 22.

The operating rod 22a is a force-transmitting member formed in one piece construction with or firmly fixed to the third lever 22, and generally in the shape of a sector gear having teeth 22b. When the rotary knob 4 is rotated in the directions shown by arrows G and H as shown in FIG. 1, the operating rod 22a rotates in directions shown by arrows Y and Z, thereby causing a third movable piece 34 to rotate in directions shown by arrows N and P. When the first lever 3 is operated in the directions shown by arrows C and D, the teeth 22b at an inclined position are brought into meshing engagement with the teeth 34a of the third movable piece 34.

As shown in FIG. 1, the second lever 6 has a short shaft 6d on each side of the base 6c, and the shafts 6d fit bearing holes 24a in the movable panel 24. The base 6c has the shafts 6d on one side and a projection 6e on the other side into which a stopper 26 and stopper spring 25 are inserted. The stopper 26 urged by the stopper spring 25 is pressed into a stopper groove 24b formed in the inner wall of the movable panel 24, as shown in FIG. 4. The projection 6e has a pressing surface 6f formed in the underside thereof and presses an abutment 27b of the arm 27. When the first lever 3 is operated in the directions shown by arrows C and D, the second lever 6 pivots upward and downward about the shafts 6d to cause the arm 27 to pivot.

The arm 27 includes shafts 27a, an abutment 27b, and a pressing portion 27c, and first, second, and third arms 27d–27f that connect the elements 27a–27c. The substantially cylindrical shaft 27a fits into a bearing groove 1a formed in the case 1 and rotatably sandwiched between the case 1 and the underside of the movable panel 24.

The case 1 has a through-hole 1e formed adjacent to the bearing groove 1a. The through-hole 1e receives the third arm 27f of the arm 27 and a projection 24c of the movable panel 24. The third arm 27f and the projection 24c are pivotal relative to the case 1. The through-hole 1e has a cutout 1f at a location opposite to the bearing groove 1a. The third arm 27f is inserted through the cutout 1f, and the pressing portion 27c abuts the cutout 1f.

The abutment 27b is a round column portion which abuts the pressing surface 6f. The pressing portion 27c causes the second movable piece 29, urged by a spring 28, to move upward and downward against the urging force of the spring 28 in directions shown by arrows Q and R. The pressing portion 27c is a round column projecting from the free end of the third arm 27f. The pressing portion 27c is positioned between the second movable piece 29 and a surface remote from the inner bottom 1d. The second movable piece 29 urged by the spring 28 always abuts the pressing portion 27c.

When the arm 27 is pressed by the pressing surface 6f to rotate about the shaft 27a, located at one end of the arm 27, in the directions shown by arrows U and V, the pressing portion 27c at the other end of the arm 27 moves over a longer distance than the abutment 27b.

The second movable piece 29 is formed with blind holes 29b in its side surface. Contact springs 30 retract into and extend from the blind holes 29b. The second movable piece 29 holds the movable contact plates 31 via the contact springs 30. The second movable piece 29 is also formed with a blind hole (not shown) in its lower surface. The spring 28 retracts into and extends from the blind hole. When the first lever 3 is operated in the directions shown by arrows C and D, the second movable piece 29 is pushed by the arm 27 upward and downward to open and close, thereby switching between the main and dimmer functions and activating the passing function. When the second movable piece 29 moves upward and downward in the directions shown by arrows Q and R, the movable contact plate 31 moves into contact with the fixed contacts 32c mounted on the second board 32.

The second board 32 has fixed contacts 32e formed on its side facing the second movable piece 29, and a guide groove 32f that engages a guide projection 29a of the second movable piece 29. The second board 32 has a shaft 32a, fastening rods 32b and 32d, and the guide groove 32e, which are formed on the side facing the first board 14. The second board 32 is insert-molded with terminals 33 that project downward from the second board 32. The terminals 33 are electrically continuous with the fixed contacts 32c.

The lower end of the second board 32 is fitted to the inner bottom of the opening 10a in the terminal panel 10, and the opening 10a is closed by the case 1, so that the second board 32 is firmly sandwiched between-the bottom of the opening 10a and the surface remote from the inner bottom 1d of the case 1. The terminals 33 of the second board 32 are inserted into the connector 10b of the terminal panel 10, the shaft 32a is fitted into the hole 14a formed in the first board 14, the fastening rod 32b is engaged with the through-hole 15c, and the fastening rod 32d is engaged with the through-hole 14c. Therefore, the second board 32 is further firmly fixed in the terminal panel 10.

The shaft 32a and fastening rods 32b and 32d are molded from, for example, a resin in one piece construction with the second board 32. The fastening rods 32b and 32d are of the same shape and have a slit in the middle of a tip thereof so that the fastening rods have resiliency, and tongues that engage the edge portions that define the through-hole 15c and 14c. The fastening rod 32b projects from the upper side of the second board 32 toward the first board 14. The fastening rod 32d projects from a lower side of the second board 32 toward the terminal panel 15.

The third movable piece 34 is a rotative member in the shape of a gear having gear teeth 34a in its outer periphery. The third movable piece 34 has a bearing hole 34b formed in its middle. The shaft 32a of the second board 32 is inserted into the bearing hole 34b, and the free end of the shaft 32a is fixed into the bearing hole 14a formed in the first board 14. Thus, the third movable piece 34 is rotatably supported on the shaft 32a. The third movable piece 34 has a movable contact strap 35 disposed around the bearing hole 34b. The movable contact strap 35 is substantially in the shape of an arc and is formed of an electrically conductive flat metal material having a spring action. When the movable contact strap 35 rotates in the directions shown by arrows N and P, the movable contact strap 35 moves into contact with the fixed contacts 14d disposed on the first board 14, thereby selecting functions of, for example, intermittent wiper, low-speed wiper, and high-speed wiper, in this order.

The movable panel 24 having a shaft 24d thereon is placed on the inner bottom 1d of the case 1 with the shaft 24d fitted into a hole 50b formed in the lid 50, thereby being rotatably supported. When the first lever 3 is operated in the directions shown by arrows A and B, the movable panel 24 rotates together with the second lever 6 about the shaft 24d in the directions shown by arrows I and J. The movable panel 24 has the projection 24c that projects from the underside, and the projection 24c engages a fastening portion 37a of a fourth movable piece 37. The fourth movable piece 37 has movable contact plates 39 assembled to an underside of the fourth movable piece 37 with contact springs 38 placed between the movable contact plates 39 and the fourth movable piece 37.

When the first lever 3 is pivoted in the directions shown by arrows A and B, the movable panel 24 rotates in the directions shown by arrows I and J. The fourth movable piece 37 is drivingly connected with the movable panel 24, and therefore, the fourth movable piece 37 moves together with the movable contact plate 39 in the directions shown by arrows S and T. The fourth movable piece 37 is located between the front surface of the third board 40 and the lower surface remote from the inner bottom 1d of the case 1. The fourth movable piece 37 is guided by edges 40a of the third board 40 to move straight in the directions shown by arrows S and T. The fourth movable piece 37 has the fastening portions 37a in the shape of two parallel plate-like projections between which the projection 24c is received. The fourth movable piece 37 is formed with blind holes in its underside. The contact springs 38 retract into and extend from the blind holes. The movable contact plates 39 move into contact engagement with the fixed contacts 41 of the third board 40, thereby causing the direction indicator to operate so that the direction indicating lamp cycles on and off The third board 40 has fixed contacts 41 and terminals 42 continuous with the fixed contacts 41, which are insert-molded with the third board 40. The third board 40 is received into an accommodating space 10c of the terminal panel 10 with the terminals 42 projecting downward from the terminal panel 10.

The movable panel 24 is formed with the opening 24e on the side where the first lever 3 is disposed. The opening 24e receives the base 6c of the second lever 6 such that the second lever 6 is pivotal through a predetermined angle. Formed substantially opposite to the opening 24e is a hollow cylinder 24f which receives the stopper spring 43 and stopper 44 such that the stopper 44 extends from the hollow cylinder 24f and retracts into the hollow cylinder 24f. The stopper 44 supports a roller 45 that abuts an end of the stopper 44 such that the roller 45 is rotatably pressed against the stopper groove 1b.

The case 1 is closed by the lid 50 with a cancel cam 46, a flat spring 47, a cam guide 48, and a coil spring 49 disposed between the lid 50 and the case 1. The case 1 is closed by the terminal panel 10 with the push rood 7, the first movable piece 8, the first board 14, the terminal panel 15, the second board 32, the third movable piece 34, and the second movable piece 29, and so forth, disposed between the lower surface of the case 1 and the terminal panel 10. The case 1 houses these parts therein, and fits to the body, and is then screwed for secure assembly.

The cancel cam 46 has shafts 46a projecting upward and downward. The downward shaft 46a loosely fits into a groove 24g formed in the movable panel 24, and the upper shaft 46a loosely fits into an elongated hole 50a formed in the lid 50. The flat spring 47 is held at both longitudinal ends by the lid 50. The middle part of the flat spring 47 urges the cancel cam 46. The cam guide 48 is placed on the movable panel 24 and is urged by the coil spring 49 toward the cancel cam 46. The lid 50 is fitted to the upper opening in the case 1.

The structure of the preferred embodiment of the invention has been described above. The assembly procedure and operation of the preferred embodiment will now be described in detail.

The shaft 27a of the arm 27 is journaled in the bearing groove 1a with the pressing portion 27c positioned under the inner bottom 1d. Assembled between the second board 32 and the first board 14 are the third movable piece 34, the movable contact strap 35, the first movable piece 8, the contact spring 11, and the movable contact plate 12. Then, the elements 34, 35, 8, 11, and 12 are inserted together with the elements 29, 30 and 31 into the opening 10a. The fourth movable piece 37 having the movable contact plate 39 and contact spring 38 is placed on the third board 40, and the third board 40 is inserted into the accommodating space 10c of the terminal panel 10. The opening 10a and the accommodating space 10c are closed by the case 1.

The third lever 22 is inserted through the base 6c of the second lever 6 into the shaft hollow cylinder 6a so that the through-hole 22d appears from the tip of the shaft hollow cylinder 6a. The push rod 7 is inserted into the cylinder 24h formed in the movable panel 24 with the head 7a at the upper end of the cylinder 24h. The stopper spring 25 and stopper 26 are inserted into the projection 6e of the second lever 6, and the shafts 6d into the bearing holes 24a, so that the second lever 6 is journaled on the movable panel 24.

The connector 51 having the cord 52 is inserted through the first lever 3, and the connector 51 is connected to the connector 18r of the nonmovable member 18. The stopper spring 19d and the stopper 20d are inserted into the blind hole 18m formed in the nonmovable member 18, and the shaft hollow cylinder 6a is inserted through the boot 5 and the first lever 3 into the round hollow cylinder 18b of the nonmovable member 18. The resilient fastening tongue 6b of the second lever 6 engages the end surface of the round hollow cylinder 18b in the cavity 18d of the nonmovable member 18, and the key 6g engages the inner wall of the round hollow cylinder 18b. Therefore, the second lever 6 is fixedly assembled to the nonmovable member 18 and the first lever 3 is rotatably journaled on the shaft hollow cylinder 6a.

The stopper springs 19a and 19b and stoppers 20a and 20b are inserted into the blind holes 18g formed in the nonmovable member 18, and the rotary knob 4 is fitted over the nonmovable member 18. Then, the shaft 22c and the rotary knob 4 are fixed together in the cavity 18d by using the pin 23, thereby coupling the rotary knob 4 to the third lever 22 so that they can rotate together. The slide knob 16 having a slide contact strap 16a is inserted into the nonmovable knob 21 with the control 16b projecting through the window 21d. The nonmovable knob 21 is inserted into the engagement portion 18c of the nonmovable member 18. The engagement portion 21a of the nonmovable knob 21 engages the tongue 18f so that the nonmovable knob 21 is secured to the nonmovable member 18.

The return spring 53 is inserted into the knob receiving hole 21b formed in the nonmovable knob 21, thereby positioning the tip of the return spring 53 to surround the bearing hole 18s. The push button 17 fits into the knob receiving hole 21b against the return spring 53 received in the knob receiving hole 21b. The stopper spring 43, stopper 44, roller 45, coil spring 49, and cam guide 48 are assembled to the movable panel 24, and the movable panel 24 is inserted into the case 1 to the bottom 1d with the projection 1c fitting into the through-hole 5a formed in the boot 5. The cancel cam 46 and the flat spring 47 are assembled to the lid 50, and the shaft 24d is fitted into the hole 50b. Then, the lid 50 is fitted onto the upper portion of the case 1 and screwed thereto. This completes the assembly.

When the rotary knob 4 is rotated in the direction shown by arrow G, the third lever 22, journaled on the rotary knob 4, rotates in the direction shown by arrow Y. Operating the third lever 22 at the operating rod 22a causes the third movable piece 34 to rotate in the direction shown by arrow N. The movable contact strap 35 rotates together with the third movable piece 34 to move into contact engagement with the fixed contacts 14d, so that the wiper operates intermittently. If the rotary knob 4 is further rotated in the direction shown by arrow E, the aforementioned structural members are rotated so that the wiper operates continuously at low speed. If the rotary knob 4 is rotated still further in the direction shown by arrow E, the wiper is switched to high speed.

When the rotary knob 4 is rotated in the direction shown by arrow H, the third lever 22 and the operating rod 22a are rotated in the direction shown by arrow Z. The movable contact strap 35 is rotated in the direction shown by arrow P together with the third movable piece 34 in mesh with the operating rod 22a, the movable contact strap 35 being sequentially positioned at the LOW SPEED position, INTERMITTENT position, and OFF position. The wiper stops when the movable contact strap 35 returns to the OFF position.

When the slide knob 16 is operated from the OFF position to the ON position, the slide contact strap 16a moves into contact with the nonmovable contact plate 18p to turn on the ASCD. When the push button 17 is depressed, the slide contact strap 17b moves into contact with the nonmovable contact plate 18n, thereby setting a predetermined cruising speed. When the control 16b is operated to the return position, the vehicle is returned to a previously set constant speed. If the control 16b is released at the return position, the control 16b returns to the ON position.

When the first lever 3 is pulled up in the direction shown by arrow C, the first lever 3, second lever 6, and third lever 22 rotate about the shafts 6d. The abutment 27b of the arm 27 is pushed by the pressing surface 6f of the second lever 6, thereby rotating about the shaft 27a in the direction shown by arrow T.

When the first lever 3 is operated in the direction shown by arrow A, the first lever 3, second lever 6, third lever 22, and movable panel 24 rotate about the shaft 24d. The movable panel 24 rotates in the direction shown by arrow I, so that the projection 24c on the underside of the movable panel 24 causes the fourth movable piece 37 to move in the direction shown by arrow S. The movable panel 24 is guided by the edge 40a of the third board 40 to move straight in the direction shown by arrow S, thereby causing the direction indicator lamp to cycle on and off. Then, if the first lever 3 is operated in the opposite direction, i.e., the direction of arrow B, the respective structural elements move in directions opposite to those when the first lever 3 is operated in the direction of arrow A.

When the first lever 3 is rotated in the direction shown by arrow E, the first lever 3 rotates about the axis of the third lever 22. The operating rod 3a rotates together with the first lever 3 in the direction shown by arrow E to lower the push rod 7. The push rod 7 causes the first movable piece 8 and the movable contact plate 12 to descend in the direction shown by arrow K while the movable contact plate 12 moves into contact with the fixed contacts 14e, thereby activating the wiper/washer.

If the driver releases the first lever 3, the stopper 20d urged by the stopper spring 19d is guided along the stopper groove 3b formed in the first lever 3, so that the first lever 3 returns to the previous OFF position. The push rod 7 and the first movable piece 8 are urged by the return spring 9 to return to the previous OFF position, thereby deactivating the wiper/washer.

The present invention having the construction described above provides the following advantages.

(1) The knob of a rotary switch, the slide knob of a slide switch, and the push button of a push button switch are all mounted at the tip of the first lever, which is an operating body of the rotary switch. Thus, the invention provides a multi-function lever switch.

(2) A control of a slide knob is prevented from sinking in the window of the nonmovable knob since a cutout formed in the slide knob engages the edge portion of the window of the nonmovable knob.

(3) A thin type slide switch is provided that can be mounted on the surface of the nonmovable knob.

(4) The user is prevented from operating the control of the slide switch by mistake.

(5) An easy-to-assemble slide switch is provided.

(6) A push button can be mounted to the nonmovable knob by a single assembly step, and a push button switch is provided where when the push button is depressed, the push button smoothly moves, thereby achieving a good operation feeling.

(7) The slide contact strap is prevented from deformation due to exerted outside force.

(8) Rattling of the push button is prevented.

(9) The construction of the rotary knob, the slide knob, and the nonmovable knob having the push button are simplified, thereby reducing the number of parts and assembly time for reduction of the total manufacturing cost, as well as miniaturizing the entire lever.

(10) The number of parts and assembly time are reduced, thereby achieving reduction of the total manufacturing cost.

(11) The first lever, the rotary knob, the nonmovable knob, the slide knob, and the push button can all be mounted on one nonmovable member, thereby ensuring a compact size of a switch mounted at the end portion of the lever.

(12) The nonmovable member can be fixed to the nonmovable knob in one assembly step.

(13) A thin-wall construction of the rotary knob, the slide knob, and the nonmovable knob, all of which are mounted around the nonmovable member, is achieved. The thin-wall construction makes the entire lever switch slim.

(14) The stopper groove can be formed in a thin plate-like stopper projection, thereby miniaturizing the entire switch.

(15) The stopper projection can serve both as a stopper and a member that firmly holds the slide contact strap by one assembly step.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An on-vehicle lever switch, comprising:
   a rotary knob;
   a third lever having the rotary knob fixed to one end thereof and an operating rod at another end thereof;
   a second lever having a shaft hollow cylinder into which a shaft of the third lever is inserted;
   a first lever into which the second lever is inserted;
   a nonmovable member fixed to the second lever; and
   a nonhmovable knob mounted at a location close to a tip of the first lever with respect to the rotary knob;
   wherein the nonmovable knob is formed with a window in its periphery, a slide knob is slidably disposed in the nonmovable knob with a control projecting through the window outwardly relative to the nonmovable knob, and a push button of a switch is disposed in a knob receiving hole formed at a location close to the tip of the first lever with respect to the nonmovable knob.

2. The on-vehicle lever switch according to claim 1, wherein the nonmovable knob has a recess at an edge portion of the window close to the tip of the first lever, and the slide knob has a cutout formed therein that engages the recess.

3. The on-vehicle lever switch according to claim 2, wherein the slide knob has guide straps on a left side and a right side thereof, and the nonmovable knob has guide grooves formed in an inner wall thereof, the guide straps fitting into the guide grooves.

4. The on-vehicle lever switch according to claim 3, wherein the nonmovable knob has a projection near the window through which the control projects outwardly from the nonmovable knob.

5. The on-vehicle lever switch according to claim 4, wherein the nonmovable knob holds the push button disposed at one opening of a knob receiving hole thereof, the slide knob is inserted from another opening of the knob receiving hole, and the slide knob is assembled to the nonmovable knob with the control projecting through the window outwardly from the nonmovable knob.

6. The on-vehicle lever switch according to claim 5, wherein the push button has a resilient fastening strap that engages a stepped portion formed in the nonmovable knob, and a slide shaft slidably inserted into a bearing hole formed in the nonmovable member.

7. The on-vehicle lever switch according to claim 6, wherein the push button has a guide groove formed in the slide shaft that engages a projection formed in a wall of the bearing hole.

8. The on-vehicle lever switch according to claim 6, wherein the nonmovable member has a first nonmovable contact plate disposed in the bearing hole, and a second nonmovable contact plate disposed on the panel surface.

9. The on-vehicle lever switch according to claim 8, wherein the nonmovable member has the first nonmovable contact plate which contacts with the slide contact strap, the second nonmovable contact plate which contacts the slide contact strap, and a terminal which is electrically continuous with the first and second nonmovable contact plates; and
   wherein both of the nonmovable contact plates and the terminal are insert-molded.

10. The on-vehicle lever switch according to claim 8, wherein the nonmovable member has:
    a flange that rotatably fits into an opening in the first lever and an opening in the rotary knob;
    a round hollow cylinder and a connector which are formed on one side of the flange, the connector having a terminal built therein;
    an engagement portion formed on the other side of the flange, the engagement portion receiving the nonmovable knob fixedly assembled via the rotary knob and receiving the slide shaft of the push button; and
    a cavity in which the third lever and the rotary knob are connected together between the flange and the engagement portion, and in which a resilient fastening tongue formed at a tip of the second lever is received.

11. The on-vehicle lever switch according to claim 10, wherein the nonmovable member has a tongue formed at a periphery of the engagement portion; and wherein the nonmovable knob has an engagement portion formed in an inner wall thereof, the engagement portion the tongue.

12. The on-vehicle lever switch according to claim 10, wherein the nonmovable member has:
a blind hole for receiving a stopper which is pressed against a stopper groove of the rotary knob;
a blind hole for receiving a stopper which is pressed against a stopper groove of the first lever; and
a hole for receiving a stopper which is pressed against a stopper groove of the slide knob.

13. The on-vehicle lever switch according to claim 12, wherein the slide knob is formed in a one-piece construction with a stopper projection which has the stopper groove formed in an underside of the stopper projection; and
wherein the nonmovable member has a slit formed therein into which the stopper projection engages, the slit crossing the hole.

14. The on-vehicle lever switch according to claim 13, wherein the slide contact strap includes a plurality of legs each of which has a contact portion at an end thereof, the legs being continuous with each other through a common part; and
wherein the slide knob has a slit formed in a lateral side thereof into which the common part is inserted, and a pull-out preventing tongue engaging the end surface of the common part, the pull-out preventing tongue being formed at an end near a base of the stopper projection.

15. The on-vehicle lever switch according to claim 5, wherein the push button has a contact strap accommodating groove formed in a slide shaft that receives a slide contact strap therein.

16. The on-vehicle lever switch according to claim 15, wherein the push button has a guide groove formed in the slide shaft that engages a projection formed in a wall of the bearing hole.

17. The on-vehicle lever switch according to claim 1, wherein the slide knob has guide straps on a left side and a right side thereof, and the nonmovable knob has guide grooves formed in an inner wall thereof, the guide straps fitting into the guide grooves.

18. The on-vehicle lever switch according to claim 1, wherein the nonmovable knob has a projection near the window through which the control projects outwardly from the nonmovable knob.

19. The on-vehicle lever switch according to claim 1, wherein the nonmovable knob holds the push button disposed at one opening of a knob receiving hole thereof, the slide knob is inserted from another opening of the knob receiving hole, and the slide knob is assembled to the nonmovable knob with the control projecting through the window outwardly from the nonmovable knob.

20. An on-vehicle lever switch, comprising:
a rotary knob;
a third lever having the rotary knob fixed to one end thereof and an operating rod at another end thereof;
a second lever having a shaft hollow cylinder into which a shaft of the third lever is inserted;
a first lever into which the second lever is inserted;
a nonmovable member fixed to the second lever; and
a nonmovable knob mounted at a location close to a tip of the first lever with respect to the rotary knob;
wherein the nonmovable knob is formed with a window in its periphery, a slide knob is slidably disposed in the nonmovable knob with a control projecting through the window outwardly relative to the nonmovable knob, and a push button of a switch is disposed in a knob receiving hole formed at a location close to the tip of the first lever with respect to the nonmovable knob;
wherein the nonmovable member has:
a flange that rotatably fits into an opening in the first lever and an opening in the rotary knob;
a round hollow cylinder and a connector which are formed on one side of the flange, the connector having a terminal built therein;
an engagement portion formed on the other side of the flange, the engagement portion receiving the nonmovable knob fixedly assembled via the rotary knob and receiving a slide shaft of the push button; and
a cavity in which the third lever and the rotary knob are connected together between the flange and the engagement portion, and in which a resilient fastening tongue formed at a tip of the second lever is received.

21. The on-vehicle lever switch according to claim 20, wherein the nonmovable member has a tongue formed at a periphery of the engagement portion; and
wherein the nonmovable knob has an engagement portion formed in an inner wall thereof, the engagement portion engaging the tongue.

22. An on-vehicle lever switch, comprising:
a rotary knob;
a third lever having the rotary knob fixed to one end thereof and an operating rod at another end thereof;
a second lever having a shaft hollow cylinder into which a shaft of the third lever is inserted;
a first lever into which the second lever is inserted;
a nonmovable member fixed to the second lever; and
a nonmovable knob mounted at a location close to a tip of the first lever with respect to the rotary knob;
wherein the nonmovable knob is formed with a window in its periphery, a slide knob is slidably disposed in the nonmovable knob with a control projecting through the window outwardly relative to the nonmovable knob, and a push button of a switch is disposed in a knob receiving hole formed at a location close to the tip of the first lever with respect to the nonmovable knob;
wherein the nonmovable member has:
a blind hole for receiving a stopper which is pressed against a stopper groove of the rotary knob;
a blind hole for receiving a stopper which is pressed against a stopper groove of the first lever; and
a hole for receiving a stopper which is pressed against a stopper groove of the slide knob.

23. The on-vehicle lever switch according to claim 22, wherein the slide knob is formed in a one-piece construction with a stopper projection which has the stopper groove formed in an underside of the stopper projection; and
wherein the nonmovable member has a slit formed therein into which the stopper projection engages, the slit crossing the hole.

24. The on-vehicle lever switch according to claim 23, wherein the slide contact strap includes a plurality of legs each of which has a contact portion at an end thereof, the legs being continuous with each other through a common part; and
wherein the slide knob has a slit formed in a lateral side thereof into which the common part is inserted, and a pull-out preventing tongue engaging the end surface of the common part, the pull-out preventing tongue being formed at an end near a base of the stopper projection.

* * * * *

UNITED STATES PATENT AND TRADEMARK OFFICE
CERTIFICATE OF CORRECTION

PATENT NO.   : 6,260,431 B1
DATED        : July 17, 2001
INVENTOR(S)  : Toshiaki Yokoyama It is certified that error appears in the above-identified patent and that said Letters Patent is hereby corrected as shown below:

<u>Column 14, claim 1,</u>
Line 1, replace "nonhmovable" with -- nonmovable --.

Signed and Sealed this

Ninth Day of April, 2002

Attest:

Attesting Officer

JAMES E. ROGAN
Director of the United States Patent and Trademark Office